May 20, 1952 — H. B. BRUNS — 2,597,447
FISH LANDING NET
Filed July 25, 1949 — 2 SHEETS—SHEET 1
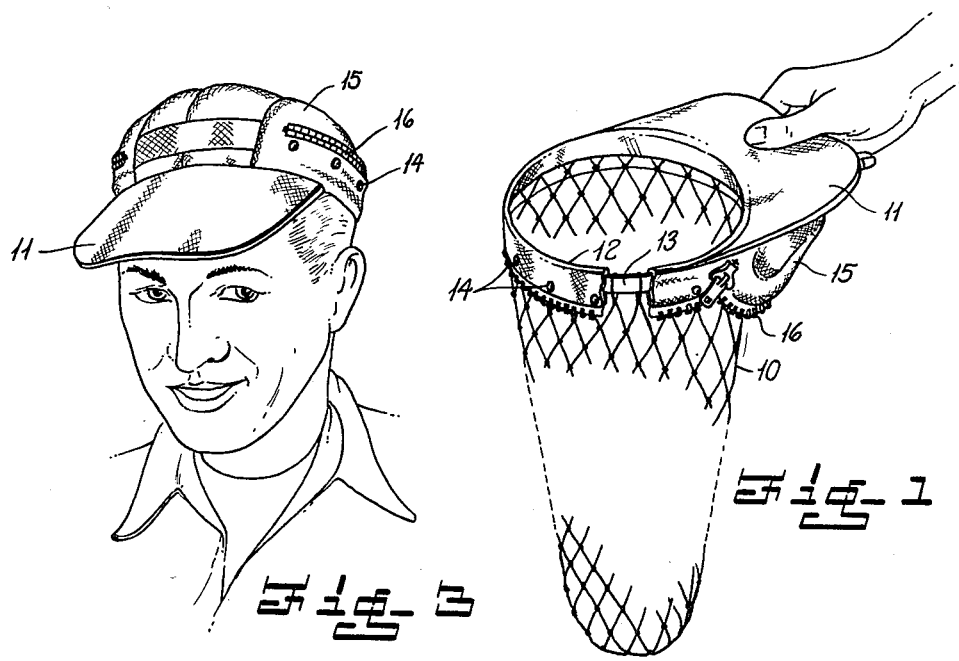
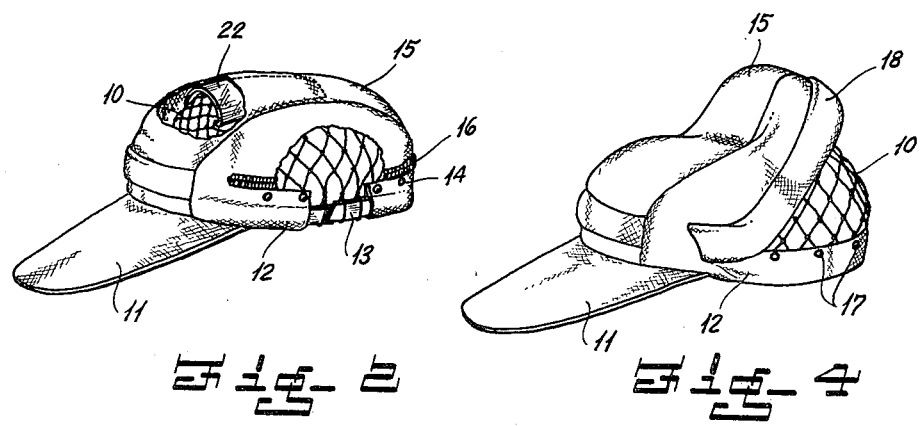
INVENTOR.
HOWARD B. BRUNS
BY
ATTORNEYS May 20, 1952 H. B. BRUNS 2,597,447
FISH LANDING NET
Filed July 25, 1949 2 SHEETS—SHEET 2
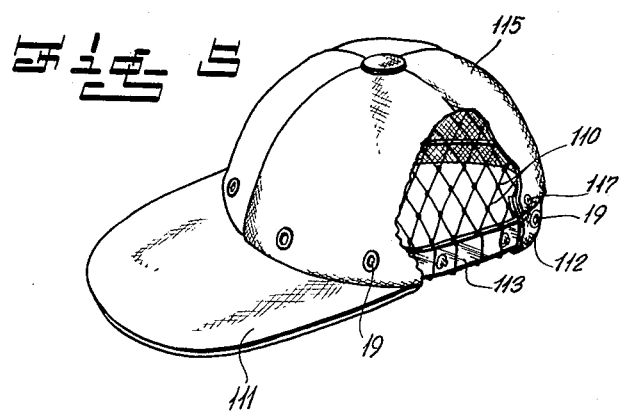
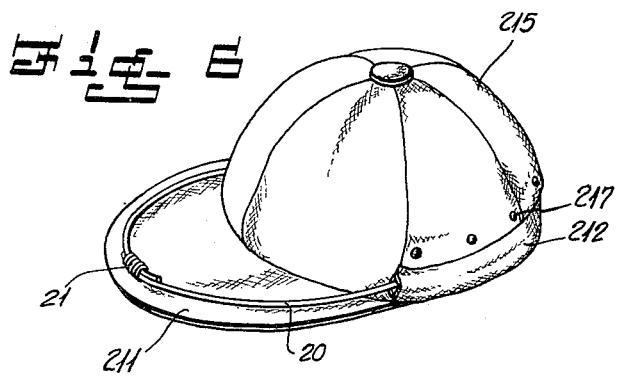
INVENTOR.
HOWARD B. BRUNS
BY
ATTORNEYS Patented May 20, 1952

2,597,447

UNITED STATES PATENT OFFICE 2,597,447

FISH LANDING NET

Howard B. Bruns, San Francisco, Calif.

Application July 25, 1949, Serial No. 106,537

4 Claims. (Cl. 43—11)

This invention relates to small dip nets of the type used to land fish such as caught by the hook and line fisherman.

The principal objects of the invention are to provide a dip net which can be carried by a fisherman as part of his usual head covering or cap, which will be covered and out of sight when not in use, and which will be readily and quickly accessible for use when needed.

The foregoing, as well as other advantages apparent from the description to follow, are achieved by incorporating the mesh portion of a dip net in a cap structure in such manner as to permit it to be collapsed and stored within the bonnet or crown of the cap when the net is not in use and so as to have the head band portion and visor of the cap respectively serve as loop and handle for the net when released for use.

Certain preferred forms of the invention are hereinafter described in detail and illustrated in the accompanying drawings, where, Figure 1 is a perspective view of the novel dip net showing how it is to be held in a user's hand;

Figure 2 shows the net container or cap, with portions of the cap cut away to show the manner of connection of the mouth of the net to the head band of the cap and the position of the net when stored within the bonnet of the cap;

Figure 3 is a view of the net container or cap as it appears on a wearer's head;

Figure 4 is a slightly modified form of the cap seen in Figure 2;

Figure 5 is a second modified form of the cap; and

Figure 6 shows still another modification in which the net is provided with an auxiliary support and handle.

Referring to the construction shown in Figures 1–4 a lining in the form of a bag-like, non-rigid elongated net 10 is associated or combined with a cap of basically well known form comprising a comparatively long sun visor, or bill, 11 firmly secured to an annular head band portion 12 of the cap. In the species of Figures 1 to 4, the head band portion 12 is tubular and contains a flexible stiffening strip 13 preferably formed from plastic or light metal to which the mouth of the net 10 is connected and from which it hangs when the net is ready for use. The tubular portion 12 is closed by a series of snap fasteners 14 which unite the upper margins of the band to form the tube or tunnel removably confining the annular strip 13. The bonnet 15 constituting a cover for the closed end of the net in the form of a substantially circular body of pliable fabric, is so related to the band portion 12 and front of the cap as to be capable of being separated for the greater part of its circumference from the band portion and thrown back on the visor 11 to open the top of the cap and permit the net to drop free through the opening thus produced, as seen in Figure 1, when the cap is inverted. The head band portion 12 and bonnet portion 15 of the cap are preferably integral, or permanently united, at the front of the cap and separably connected at the sides and rear. For example, the head band portion 12 may be stitched to the visor 11 and the bonnet portion 15 may be stitched to that part of the head band portion which is secured to the visor. The separable fastening means may consist of a slide fastener 16, as in Figures 1, 2 and 3, or of a series of snap fasteners 17 seen in Figures 4, 5 and 6.

In the modification of Figure 4 the upper edges of the tubular band 12 are united by stitching and the male halves of the snap fasteners 17 are carried under a concealing band 18 thus simplifying the construction and improving the appearance of the cap.

In the modification of Figure 5, the entire circumference of the bonnet portion 115 of the cap is shown as directly connected to the flexible strip 113 by snap fasteners 19, the male halves of which are carried by the strip instead of by the band portion 112. The second series of snap fasteners 117 located above the fasteners 19 at the sides and rear of the cap provide for throwing open the bonnet. In Figure 5, elements corresponding to elements described in Figures 1–4 have been indicated by the same reference numerals with one hundred added thereto.

The modification of Figure 6 differing from those heretofore described essentially in that the flexible strip 13 is reinforced by a wire loop 20, which runs within the band 212, which carries the net in the same manner as in the other modifications but differs in that loop 20 is extended out over the visor 211 where its ends may be united by a slip joint 21 allowing some expansion of the loop to better accommodate the cap to differing head sizes. This loop serves to add strength to the visor and band when in use as a dip-net. In Figure 6, elements corresponding to elements described in Figures 1–4 have been indicated by the same reference numerals with two hundred added thereto.

In each of the modifications illustrated, the inside of the bonnet or crown of the cap is provided with a pocket 22, Figure 2, fastened to the bonnet and serving as a receptacle or container for the major portion of the net when stored within the cap. This pocket may preferably be of waterproof fabric.

As will be evident from the foregoing descriptions, the novel association of a net structure with a cap enables the fisherman to carry the net with absolutely no hindrance to his physical movements, such as might be caused by the conventional type of landing net, which hangs from the belt or is strapped over the shoulder. With the device of this invention, the cap can be used as a landing net, through the simple expedient of unfastening the bonnet or crown of the cap from the head band or rim, pulling the free end of the net from out of the pocket 22, and holding the cap by the visor 11 with the bonnet retained against the upper side of the visor by the forefinger, in the manner illustrated by Figure 1. The visor, or, in the case of the structure of Figure 6, the visor and extension of loop 20, affording a firm and convenient handle for holding and manipulating the net while in use. After such use, the bonnet can be quickly closed and the net tucked back into the pocket to restore the cap for use as such.

The scope of the invention as herein claimed, obviously permits of changes in details of construction without departure from the essential features thereof, and what is claimed is:

1. A dip-net and carrier therefor, comprising an annular flexible strip, adapted to fit a man's head, a non-rigid, elongated, bag-like net, said net being open at one end and closed at its other end and being connected at its open end to the strip, and a carrier for said net and strip, comprising a stiff, flat, visor-like member having a tubular band portion housing the strip, said member projecting radially from a portion of the periphery of the band to constitute a handle, a cover for the closed end of the net consisting of a dome shaped member of pliable fabric having a portion of its circumference permanently connected to the band portion adjacent the visor-like member and the remainder of its circumference separably connected to said tubular band, and a storage pocket for the free portion of the net carried on the inner surface of said cover.

2. A dip-net comprising a flexible annular band adapted to fit a man's head, a non-rigid, elongated, bag-like net, said net being open at one end and closed at its other end and being connected at its open end to said band, and a carrier for said net comprising a stiff, flat, visor-like member connected to the band and projecting radially from a portion of the periphery of the band to constitute a handle, a cover for the closed end of the net consisting of a dome-shaped member of pliable fabric having a portion of its circumference permanently connected to the band adjacent the visor-like member and the remainder of its circumference separably connected to the band, and a storage pocket for the free portion of the net carried on the inner surface of said cover.

3. A dip-net comprising a flexible annular band adapted to fit a man's head, a bag-like net, said net being open at one end and closed at its other end and being connected at its open end to said band, and a carrier for said net comprising a stiff, flat, visor-like member connected to the band and projecting radially from a portion of the periphery of the band to constitute a handle, a cover for the closed end of the net consisting of a dome-shaped member of pliable fabric having a portion of its circumference permanently connected to the band adjacent the visor-like member and the remainder of its circumference separably connected to the band, a reinforcing wire loop in said band having an extended portion lying adjacent the periphery of the visor-like member, and a storage pocket for the free portion of the net carried on the inner surface of said cover.

4. A cap and net structure comprising an annular flexible strip adapted to fit a man's head, a substantially circular outer body portion of pliable fabric constituting a cover, a lining comprising a bag-like, non-rigid, elongated net connected at its open end to the strip, a carrier for said net and strip including a stiff, flat, visor-like member having a tubular band portion housing the strip, said member projecting radially from a portion of the periphery of the band to constitute a handle, said net having a larger area than said cover portion thereby constituting a free portion thereof, said cover portion having the lesser portion of its circumference permanently connected to the band portion adjacent the visor-like member and the remainder of its circumference separably connected to said tubular band, and a storage pocket for the free portion of the net carried on the inner surface of said cover.

HOWARD B. BRUNS.

REFERENCES CITED

The following references are of record in the file of this patent:

UNITED STATES PATENTS

| Number | Name | Date |
| --- | --- | --- |
| 290,621 | Wood | Dec. 18, 1883 |
| 619,065 | Bjornsen | Feb. 7, 1899 |
| 1,105,400 | Burke | July 28, 1914 |
| 1,156,487 | Kunstadter | Oct. 12, 1915 |
| 1,581,750 | Mantilla | Apr. 20, 1926 |
| 1,598,314 | Rosenberg | Aug. 31, 1926 |
| 1,610,241 | Billings | Dec. 14, 1926 |
| 1,648,551 | Klein | Nov. 8, 1927 |
| 2,124,431 | Praytor | July 19, 1938 |